June 24, 1958    R. G. CORBIN ET AL    2,839,912
TAIL GATE LATCH

Filed Oct. 14, 1955    2 Sheets-Sheet 1

INVENTORS
Bewley D. Priestman &
Russel G. Corbin
BY
Paul Fitzpatrick
ATTORNEY

June 24, 1958  R. G. CORBIN ET AL  2,839,912
TAIL GATE LATCH
Filed Oct. 14, 1955  2 Sheets-Sheet 2
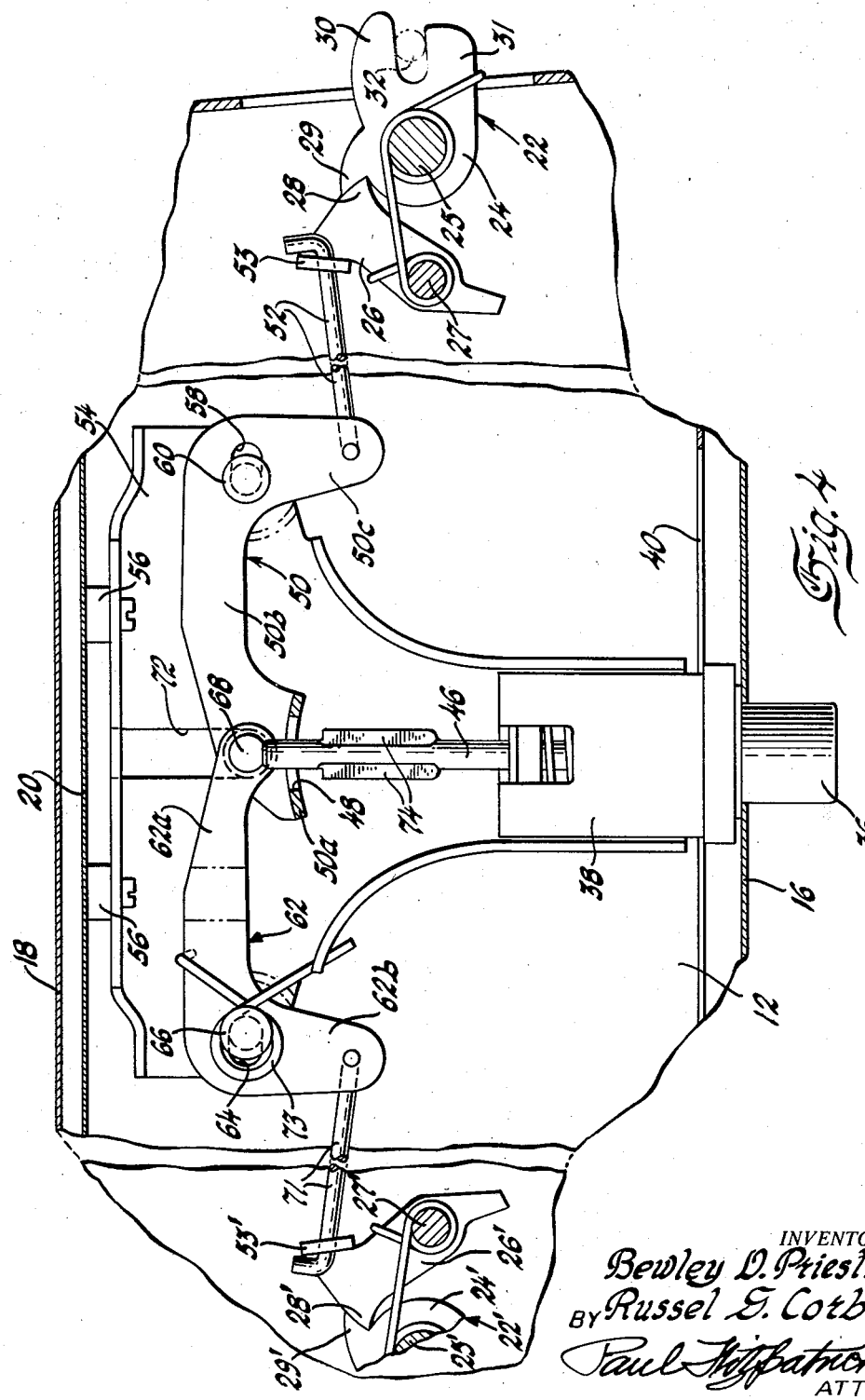
INVENTORS
Bewley D. Priestman &
BY Russel G. Corbin
Paul Fitzpatrick
ATTORNEY

United States Patent Office 2,839,912
Patented June 24, 1958

2,839,912

TAIL GATE LATCH

Russel G. Corbin, Inkster, and Bewley D. Priestman, Grosse Pointe Woods, Mich., assignors to General Motors Corporation, Detroit, Mich., a corporation of Delaware Application October 14, 1955, Serial No. 540,513

10 Claims. (Cl. 70—141)

This invention relates to a latch, and more particularly to a station wagon tail gate latch.

One feature of the invention is that it provides an improved latch; another feature of the invention is that it provides a centrally disposed single control member for operating a pair of latches disposed adjacent opposite sides of a vehicle; a further feature of the invention is that the actuator for the pair of latches includes two levers, each lever being connected to one of the latches and one of the levers being articulated to the other, and a single control member for swinging both levers to release the latches; still another feature of the invention is that it includes a simple locking device comprising an axially movable control rod having wings adapted to engage one of the levers to release the latches when the rod is rotated to one position, the wings being adapted to pass freely through notches in one of the levers when the rod is rotated to another position; and yet a further feature of the invention is that it provides a push button type latch actuator having low initial push button effort because of a toggle operation during initial push button travel, and having direct lever action toward the end of push button travel to positively release the latch.

Other features and advantages of the invention will be apparent from the following description and from the drawings, in which:

Fig. 4 is a view of the actuating mechanism taken along the line 4—4 of Fig. 2.

Figure 1:
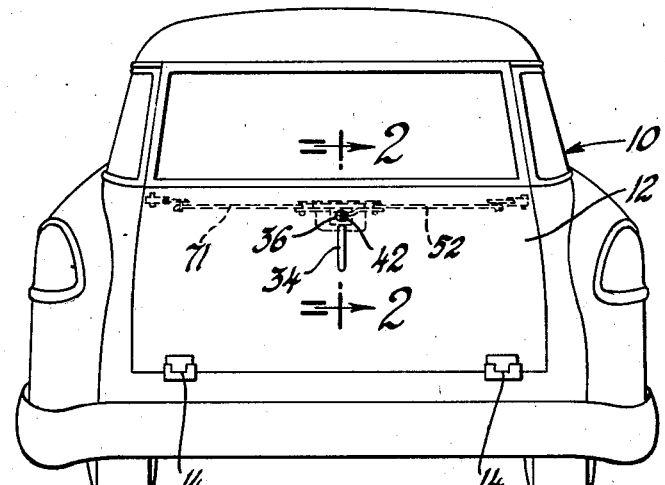
Fig. 1 is a rear view of a station wagon incorporating the improved latch.
Figure 2:
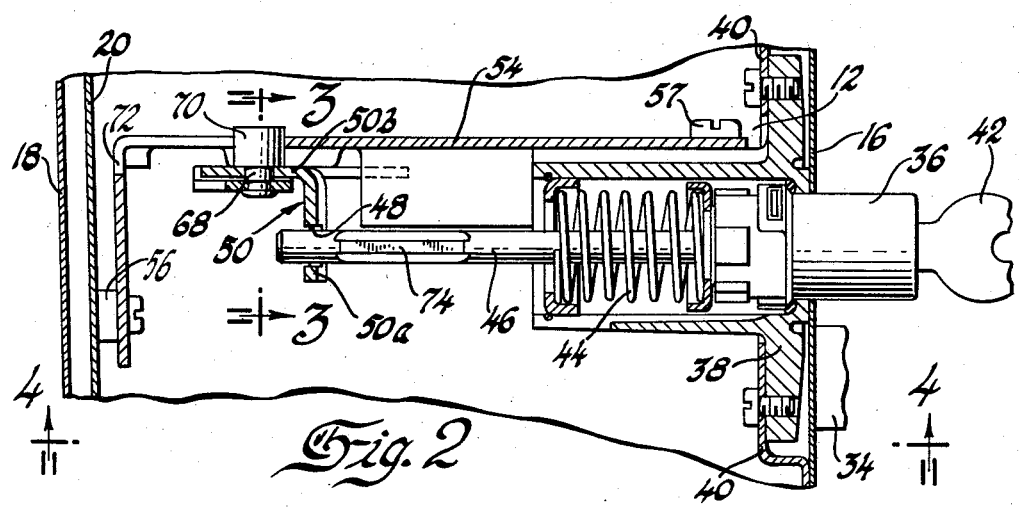
Fig. 2 is an enlarged vertical section through the actuator taken along the line 2—2 of Fig. 1, the parts being shown in locked position.

Referring now to the drawings, a station wagon 10 has a tail gate 12 hingedly mounted along its lower side on hinges 14. The tail gate may be swung between the closed position shown in Fig. 1 and an open position in which the tail gate conventionally is held in a horizontal position by chains, struts or similar retaining means. As shown in Figs. 2 and 4, the tail gate has an outer panel 16 and an inner panel 18 backed by a reinforcing panel 20. The latches and the latch actuating mechanisms are mounted between the inner and outer panels.

As shown in Fig. 4, there is a pair of latches 22 and 22′ disposed adjacent opposite sides of the station wagon. These latches are shown only fragmentarily since the exact latch structure has no bearing on this invention and since tail gate latches of this general type are conventional and are well known in the art. Since the latches are identical, only one will be described and the corresponding parts of the other will be designated by similar reference characters having a prime (′). Each of the latches illustrated includes a bolt 24 swingably mounted on a stud 25 on the tail gate 12 and a detent 26 pivotally mounted on a stud 27. The detent has a foot 28 engageable with a latching shoulder 29 on the bolt. Latching arms 30, 31 on the bolt straddle a keeper 32 on the station wagon body.

Adjacent the center of the vehicle on the outside panel of the tail gate there is a fixed gripping handle 34 and immediately above this handle a push button 36 extends out through the outer panel of the tail gate, being mounted in a housing 38 which is screwed to a bracket 40 welded to the inner surface of the outer panel 16. The push button assembly is conventional and includes a conventional locking cylinder adapted to be operated by a key 42. Within the housing 38 there is a coil spring 44 which biases the push button 36 to an outer position as illustrated in the drawings. The push button and locking cylinder are connected to a control rod 46 which is axially movable when the push button is operated and which is rotatable through an arc of 90° when the key is turned to lock the tail gate. The free end of the control rod 46 extends through an elongated rectangular opening 48 in a depending flange 50a which is turned at the end of an arm 50b in a bell crank lever 50. The other arm 50c of the bell crank lever is connected to the detent 28 by means of a link 52. A lost motion connection in one direction is provided, the turned outer end of the rod 52 projecting through and being slidable in a hole in a flange 53 projecting from the detent. The bell crank 50 is pivotal and slidable in a limited path on a mounting bracket 54 which is secured to the reinforcing panel 20 by screw and spacer devices 56 and which is secured to the push button housing 38 by a screw 57. The bell crank has an elongated slot 58 through which a mounting pin 60 projects to provide a pivotal and limited sliding mounting.

A second bell crank lever 62 has a slot 64 through which a mounting pin 66 projects to mount the bell crank 62 on the bracket 54 for pivotal movement and for limited sliding movement. One arm 62a of bell crank 62 is articulated to the arm 50b of the bell crank 50 by a connecting stud 68 which has a widened guide portion 70 engaging a straight slot 72 in the bracket 54 to guide movement of the two levers. A second arm 62b of the bell crank 62 is connected to the detent 28′ by means of a link 71. A spring 73 biases both bell crank levers to the position shown.

Figure 3:
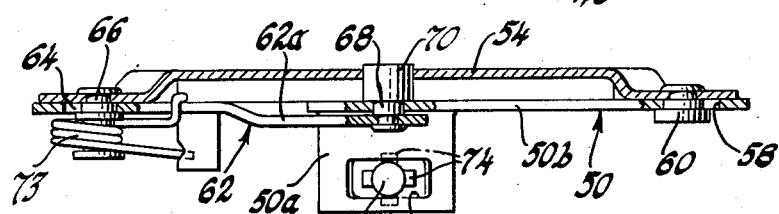
Fig. 3 is a detail section taken along the line 3—3 of Fig. 2, the parts being shown in solid lines in locked position and in broken lines in unlocked position.

The rod 46 has oppositely disposed wings 74 which are adapted to pass freely through the opening 48 when the rod 46 is moved axially when rotated to one position and to abut against the flange 50a when the rod is moved axially when rotated to another position. When the parts are in the locked position of Fig. 2 and the push button 36 is pushed in, the rod 46 will move axially inwardly, its free end, including the wings 74, passing freely through the opening 48. In the event that the key is turned to rotate the rod 46 through an arc of 90° to the position shown in Fig. 3, the inner ends of the wings 74 will engage the flange 50a when the push button is operated to swing both levers 50 and 62 and release both detents to permit movement of the latch bolts to unlatched position. With the push button depressed, the tail gate may be opened by means of the gripping handle 34. When the tail gate is closed, the latch bolts will be cammed by the associated keepers into latching engagement therewith and the toothed portions 28, 28′ of the detents will cam over the latching shoulders 29, 29′, respectively, on the bolts and then move into latching position under the influence of springs which are conventional in latches of this type. The lost motion connection between each of the detents and the associated link permits this camming movement of the detents without moving the bell crank levers. The engagement of the guide stud 70 in the slot 72 together with the stud and slot mounting of each of the bell crank levers restrains the ends of the bell crank arms to movement in a straight path and prevents any possibility that the wings 74 will jam against the ends of the opening 48.

This construction achieves low initial push button effort by virtue of the toggle operation during the initial push button travel and direct lever action is achieved toward the end of push button travel to insure positive latch releasing action. During the initial travel of the push button, the bell crank levers may slide in their respective slots 58, 64 so that the push button movement is smooth and easy. As the push button progresses towards the end of its travel, the bell crank levers reach the end of the slots so that their sliding movement ceases and the only movement of which they are capable is pivotal movement, thus providing a direct lever action to retract the detents 28, 28'.

While we have shown and described one embodiment of our invention, it is capable of many modifications. Changes, therefore, in the construction and arrangement may be made without departing from the spirit and scope of the invention as set forth in the appended claims.

We claim:

1. A vehicle tail gate latch of the character described, including: a pair of latches adapted to be disposed adjacent opposite sides of the vehicle; a mounting bracket disposed between said latches; a first bell crank lever pivotally mounted on said bracket for limited sliding movement, said lever having one arm connected to one latch and another arm terminating in a turned flange; a second bell crank lever pivotally mounted on said bracket for limited sliding movement, said second lever having one arm connected to the other latch and another arm articulated to said other arm of the first lever on a pivot which is fixed relative to both levers; and an axially shiftable control rod adapted to engage said flange to swing both levers upon axial movement of the rod, the slidable mounting of each bell crank lever in combination with the pivotal interconnection thereof providing low initial effort in the shifting of said control rod.

2. A station wagon tail gate latch of the character described, including: a pair of latches adapted to be disposed adjacent opposite sides of the station wagon; a mounting bracket disposed between said latches, said mounting bracket having a guide slot therein; a first bell crank lever pivotally mounted on said bracket for limited sliding movement, said lever having one arm connected to one latch and another arm terminating in a turned flange; a second bell crank lever pivotally mounted on said bracket for limited sliding movement, said second lever having one arm connected to the other latch and another arm articulated to said other arm of the first lever; means on one of said levers engaging said guide slot for guiding movement of the lever; and an axially shiftable control rod adapted to engage said flange to swing both levers upon axial movement of the rod.

3. A station wagon tail gate latch of the character described, including: a pair of latches adapted to be disposed adjacent opposite sides of the station wagon; a mounting bracket disposed between said latches, said mounting bracket having a guide slot therein; a first bell crank lever pivotally mounted on said bracket for limited sliding movement, said lever having one arm connected to one latch and another arm terminating in a turned flange with an opening; a second bell crank lever pivotally mounted on said bracket for limited sliding movement, said second lever having one arm connected to the other latch and another arm articulated to said other arm of the first lever; means on one of said levers engaging said guide slot for guiding movement of the levers; and a rotatable and axially shiftable control rod having an end portion extending through said opening and a winged intermediate portion adapted to engage said flange and swing both levers when the rod is shifted axially while it is rotated to one position, the winged portion sliding through the opening without swinging said levers when the rod is shifted axially while it is rotated to another position.

4. A station wagon tail gate latch of the character described, including: a pair of latches adapted to be disposed adjacent opposite sides of the station wagon; a mounting bracket disposed between said latches, said bracket having a guide slot therein; a first bell crank lever pivotally mounted on said bracket for limited sliding movement, said lever having one arm connected to one latch and another arm terminating in a turned flange with an opening; a second bell crank lever pivotally mounted on said bracket for limited sliding movement, said second lever having one arm connected to the other latch and another arm articulated to said other arm of the first lever; means on one of said levers engaging said guide slot for guiding movement of the levers; a rotatable and axially shiftable control rod having an end portion extending through said opening and a winged intermediate portion adapted to engage said flange and swing both levers when the rod is shifted axially while it is rotated to one position, the winged portion sliding through the opening without swinging said levers when the rod is shifted axially while it is rotated to another position; means for shifting said rod axially; and locking means for rotating said rod.

5. A station wagon tail gate latch of the character described, including: a pair of latches adapted to be disposed adjacent opposite sides of the station wagon, each latch comprising a swingable bolt and a detent for holding the bolt in latched position; a mounting bracket disposed between said latches; a first bell crank lever pivotally mounted on said bracket for limited sliding movement said lever having one arm connected to the detent of one latch and another arm terminating in a turned flange with an elongated opening; a second bell crank lever pivotally mounted on said bracket for limited sliding movement, said second lever having one arm connected to the detent of the other latch and another arm articulated to said other arm of the first lever; a rotatable and axially shiftable control rod having an end portion extending through said opening and a winged intermediate portion adapted to engage said flange and swing both levers when the rod is shifted axially while it is rotated to one position, the winged portion sliding through the opening without swinging said levers when the rod is shifted axially while it is rotated to another position; and push button means for shifting said rod axially.

6. Apparatus of the character claimed in claim 5, wherein said second lever is articulated to said first lever by means of a stud having a guide portion extending through a guide slot in said bracket.

7. A station wagon tail gate latch of the character described, including: a pair of latches adapted to be disposed adjacent opposite sides of the station wagon, each latch comprising a swingable bolt and a detent for holding the bolt in latched position; a mounting bracket disposed between said latches; a first bell crank lever pivotally mounted on said bracket for limited sliding movement, said lever having one arm connected to the detent of one latch and another arm terminating in a turned flange with an elongated opening; a second bell crank lever pivotally mounted on said bracket for limited sliding movement, said second lever having one arm connected to the detent of the other latch and another arm articulated to said other arm of the first lever; and a rotatable and axially shiftable control rod having an end portion extending through said opening and a winged intermediate portion adapted to engage said flange and swing both levers when the rod is shifted axially while it is rotated to one position, the winged portion sliding through the opening without swinging said levers when the rod is shifted axially while it is rotated to another position.

8. A station wagon tail gate latch of the character described, including: a pair of latches adapted to be disposed adjacent opposite sides of the station wagon, each latch comprising a swingable bolt and a detent for holding the bolt in latched position; a mounting bracket disposed between said latches; a first bell crank lever pivotally mounted on said bracket for limited sliding movement, said lever having one arm connected to the detent of one latch and another arm terminating in a turned flange with an elongated opening, a second bell crank lever pivotally mounted on said bracket for limited sliding movement, said second lever having one arm connected to the detent of the other latch and another arm articulated to said other arm of the first lever; a rotatable and axially shiftable control rod having an end portion extending through said opening and a winged intermediate portion adapted to engage said flange and swing both levers when the rod is shifted axially while it is rotated to one position, the winged portion sliding through the opening without swinging said levers when the rod is shifted axially while it is rotated to another position; push button means for shifting said rod axially; and locking means for rotating said rod.

9. A vehicle tail gate latch of the character described, including: a pair of latches adapted to be disposed adjacent opposite sides of the vehicle, each latch comprising a swingable bolt and a detent for holding the bolt in latched position; a first operating lever connected to the detent of one latch; a second operating lever articulated to said first lever on a pivot which is fixed relative to both levers and connected to the detent of the other latch; separate means for mounting each operating lever at spaced points for pivotal and bodily slidable movement; and an axially shiftable control rod adapted to engage one lever, said rod swinging both levers to release the latches upon axial movement of the rod, the bodily slidable mounting of each operating lever in combination with the pivotal interconnection thereof providing low initial effort in the shifting of said control rod.

10. A vehicle tail gate latch of the character described, including: a pair of latches adapted to be disposed adjacent opposite sides of the vehicle; a first bell crank lever having one arm connected to one latch and another arm terminating in a turned flange; a second bell crank lever having one arm connected to the other latch and another arm articulated to said other arm of the first lever on a pivot which is fixed relative to both levers; separate means for mounting each bell crank lever at spaced points for pivotal and bodily slidable movement; and an axially shiftable control rod adapted to engage said flange to swing both levers upon axial movement of the rod, the slidable mounting of each bell crank lever in combination with the pivotal interconnection thereof providing low initial effort in the shifting of said control rod.

References Cited in the file of this patent

UNITED STATES PATENTS

| 934,153 | Flowers | Sept. 14, 1909 |
| 1,058,346 | Berstler | Apr. 8, 1913 |
| 1,174,652 | Banks | Mar. 7, 1916 |
| 1,677,271 | Carroll | July 17, 1928 |

FOREIGN PATENTS

| 383,359 | Great Britain | Nov. 17, 1932 |